(12) United States Patent
Closson

(10) Patent No.: US 6,254,189 B1
(45) Date of Patent: Jul. 3, 2001

(54) BODY SUPPORT DEVICE FOR VEHICLES

(76) Inventor: Victoria Hunter Closson, 12747 Blair Rd., Lusby, MD (US) 20657

(*) Notice: Subject to any disclaimer, the term of this patent is extended or adjusted under 35 U.S.C. 154(b) by 0 days.

(21) Appl. No.: 09/502,110

(22) Filed: Feb. 10, 2000

(51) Int. Cl.$^7$ .................................................. A47C 7/36
(52) U.S. Cl. ................................. 297/397; 5/636; 5/644
(58) Field of Search ......................... 297/397; 5/636, 5/644, 640, 911, 702

(56) References Cited

U.S. PATENT DOCUMENTS

| | | | |
|---|---|---|---|
| 1,787,832 | * 1/1931 | Mueller | 5/636 |
| 2,522,120 | * 9/1950 | Kaskey et al. | 5/644 X |
| 2,589,155 | * 3/1952 | Smith | 5/644 X |
| 3,185,497 | 5/1965 | Lagace | 280/150 |
| 3,220,770 | 11/1965 | Schaeffer | 297/395 |
| 3,327,330 | * 6/1967 | McCullough | 5/640 |
| 3,604,026 | 9/1971 | Scheips | 5/337 |
| 4,607,403 | * 8/1986 | Alivizatos | 5/636 X |
| 4,679,262 | * 7/1987 | Davis et al. | 5/644 |
| 4,738,488 | * 4/1988 | Camelio | 5/636 X |
| 4,967,429 | 11/1990 | Vlad | 5/434 |
| 5,026,315 | * 6/1991 | Chap | 5/636 X |
| 5,538,323 | 7/1996 | Henkel | 297/397 |
| 5,544,377 | * 8/1996 | Gostine | 5/630 |
| 5,996,152 | * 12/1999 | Wilson | 5/640 X |

* cited by examiner

*Primary Examiner*—Peter M. Cuomo
*Assistant Examiner*—Stephen Vu
(74) *Attorney, Agent, or Firm*—Henderson & Sturm LLP

(57) ABSTRACT

A body support device (10) for the interior of a vehicle equipped with seats (101). The device (10) includes a hollow housing member (20) having bulbous housing elements (21), (22) disposed on the opposite ends of a hollow neck portion (23) which combine to form a continuous hollow chamber (24) which is only partially filled with a volume of filler material (30) comprising particles (31) which can be redistributed within the hollow chamber (24) to vary the firmness and density of the respective bulbous housing element.

11 Claims, 6 Drawing Sheets

BODY SUPPORT DEVICE FOR VEHICLES

BACKGROUND OF THE INVENTION

1. Field of the Invention

The present invention relates to the field of body supporting devices such as neck rests and the like in general, and in particular to a variable volume body support device for necks and elbows.

2. Description of Related Art

As can be seen by reference to the following U.S. Pat. Nos. 3,185,497; 3,220,770; 3,604,026; 4,967,429; and 5,538,323, the prior art is replete with myriad and diverse dual pillow head and or neck rest arrangements.

While all of the aforementioned prior art constructions are more than adequate for the basic purpose and function for which they have been specifically designed, they are uniformly deficient with respect to their failure to provide a simple, efficient, and practical approach to allow the user to selectively redistribute the contents of the cushion elements to customize the relative density or firmness of that portion of the body support device that their body rests upon.

As most travelers are all too well aware, all of the commercially available head and/or neck rests have their own unique texture and firmness so that a process of trial and error is required by the consumer to determine which particular headrest or the like has a suitable firmness that appeals to that individual purchaser.

As a consequence of the foregoing situation, there has existed a longstanding need for a new and improved type of body support device whose unique construction allows the filler material to be redistributed within the interior of the body support device to customize the firmness and/or weight distribution therein, and the provision of such a construction is a stated objective of the present invention.

BRIEF SUMMARY OF THE INVENTION

Briefly stated, the body support device that forms the basis of the present invention comprises in general, an outer housing unit and an interior filler unit that may be selectively redistributed within the outer housing unit to vary the firmness and weight distribution of different portions of the body support device.

As will be explained in greater detail further on in the specification, the housing unit comprises an elongated contoured housing member having a pair of generally bulbous housing elements formed on the opposite ends of the housing member. The bulbous housing elements are connected together by an elongated hollow neck portion.

In addition, the filler unit includes a filler material comprising a volume of generally resilient somewhat deformable particles, such as Styrofoam beads, foam rubber, foamed plastic, seed husks, or the like. The filler material is loosely contained within the interior of the housing unit.

As a consequence of the foregoing situation, the filler material can be selectively redistributed within the housing member to vary the filler material volume and density within the generally bulbous housing elements.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
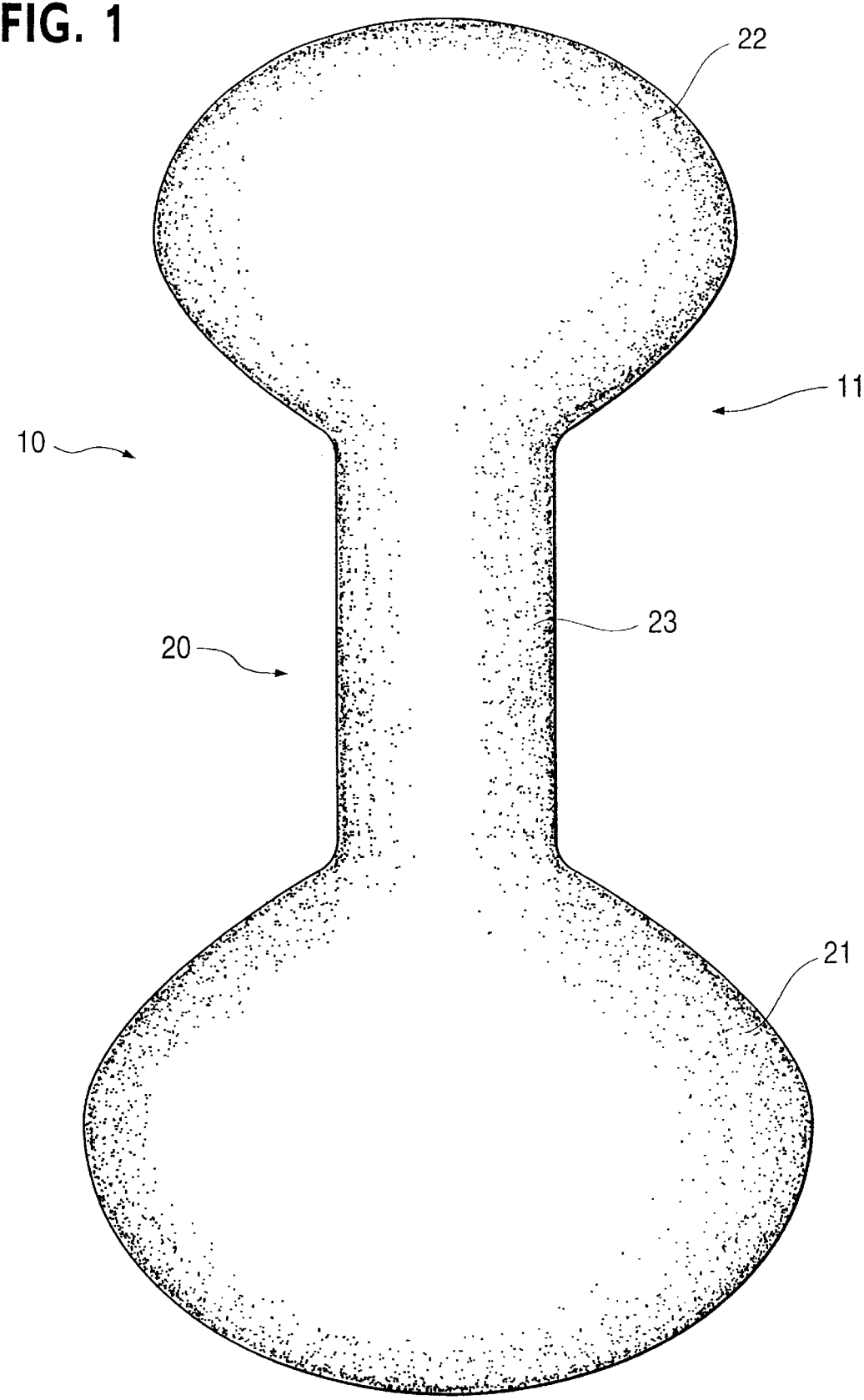
FIG. 1 is a top plan view of one version of the preferred embodiment.

As can be seen by reference to the drawings, and in particular to FIG. 1, the body support device that forms the basis of the present invention is designated generally by the reference number 10. The body support device 10 comprises in general a housing unit 11, and a filler unit 12. These units will now be described in seriatim fashion.

Figure 2:
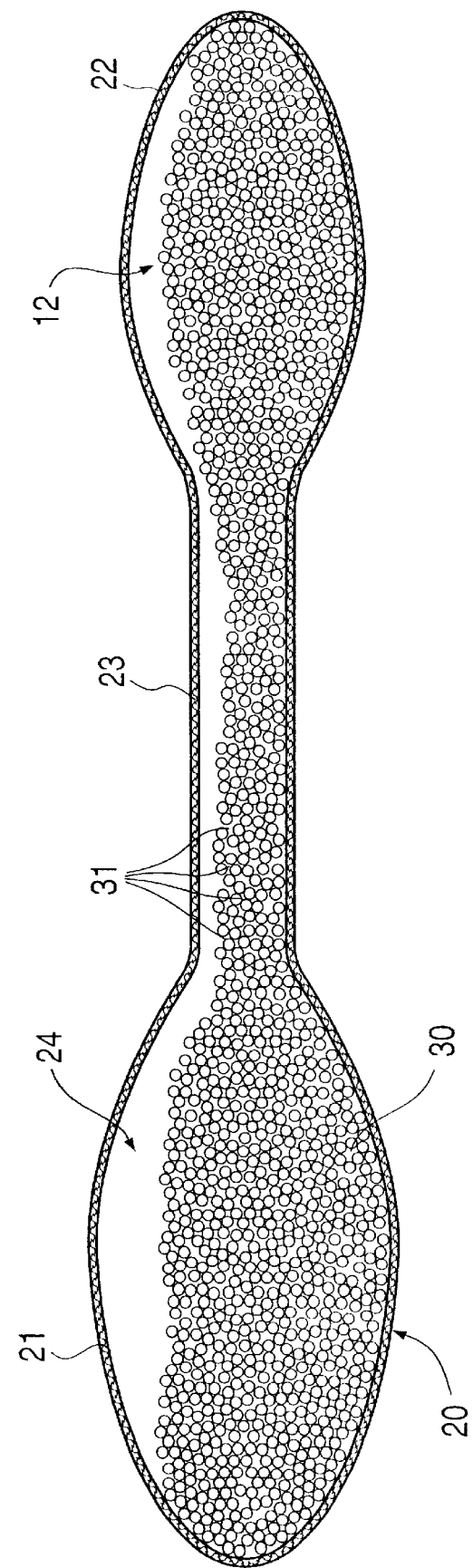
FIG. 2 is a cross sectional view of the first version of the preferred embodiment.

In the first version of the preferred embodiment illustrated in FIGS. 1 and 2, it can be seen that the housing unit 11 comprises an elongated hollow housing member 20 having two generally bulbous housing elements 21, 22 disposed on the opposite ends of the housing member 20. The bulbous housing elements 21, 22 are connected to one another by an elongated hollow neck portion 23. The interior of the housing elements 21, 22 and the neck portion 23 define a continuous elongated hollow chamber 24 whose purpose and function will be described presently.

As can be seen by reference to FIG. 2, the filler unit 12 includes filler material 30 comprising a volume of generally resilient somewhat deformable particles 31 such as Styrofoam beads, foam rubber, foamed squares, seed husks or the like which only partially fills the interior hollow chamber 24 of the housing member 20 such that the filler material 30 can be redistributed within the hollow chamber 24 to vary the firmness and or density of the filler material 30 in the bulbous housing elements 21, 22.

Figure 3:
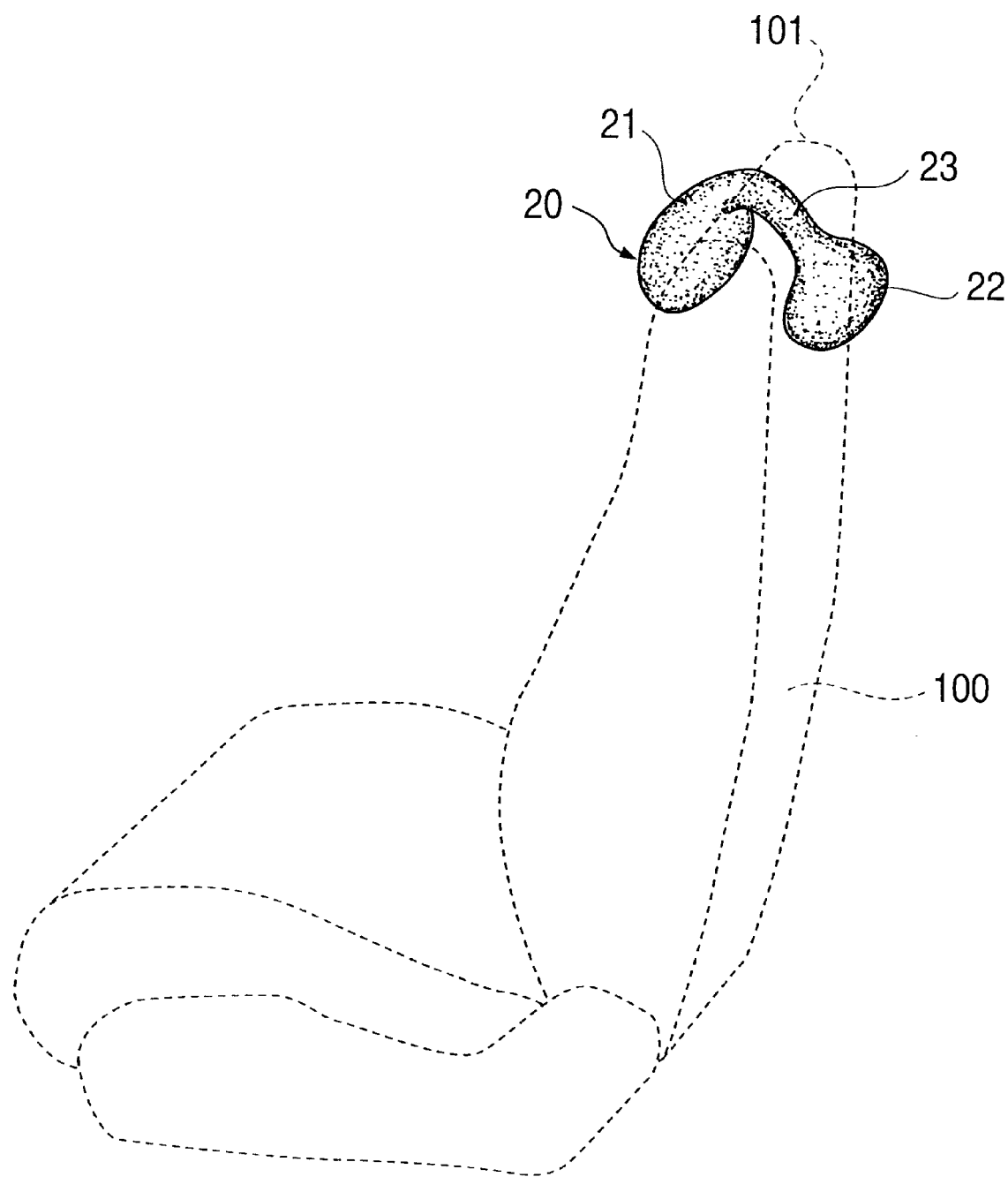
FIG. 3 is a perspective view of the first version of the preferred embodiment in use.

As shown in FIGS. 1 through 3, in the first version of the preferred embodiment, the generally bulbous housing element 21 on one end of the housing member 20 is substantially larger than the generally bulbous housing element 22 on the other end of the housing member 20.

The reason for this disparity in the relative sizes of the bulbous housing elements 21, 22 is due to the fact that this version of the preferred embodiment is intended primarily to be disposed over the top 101 of a vehicle seat 100. The larger bulbous housing element 21 will be disposed behind a person's head and neck and the smaller bulbous housing element 22 will be suspended by the neck portion 23 of the housing member 20 to function as a counterweight that will maintain the larger bulbous housing element 21 in place during use.

Figure 4:
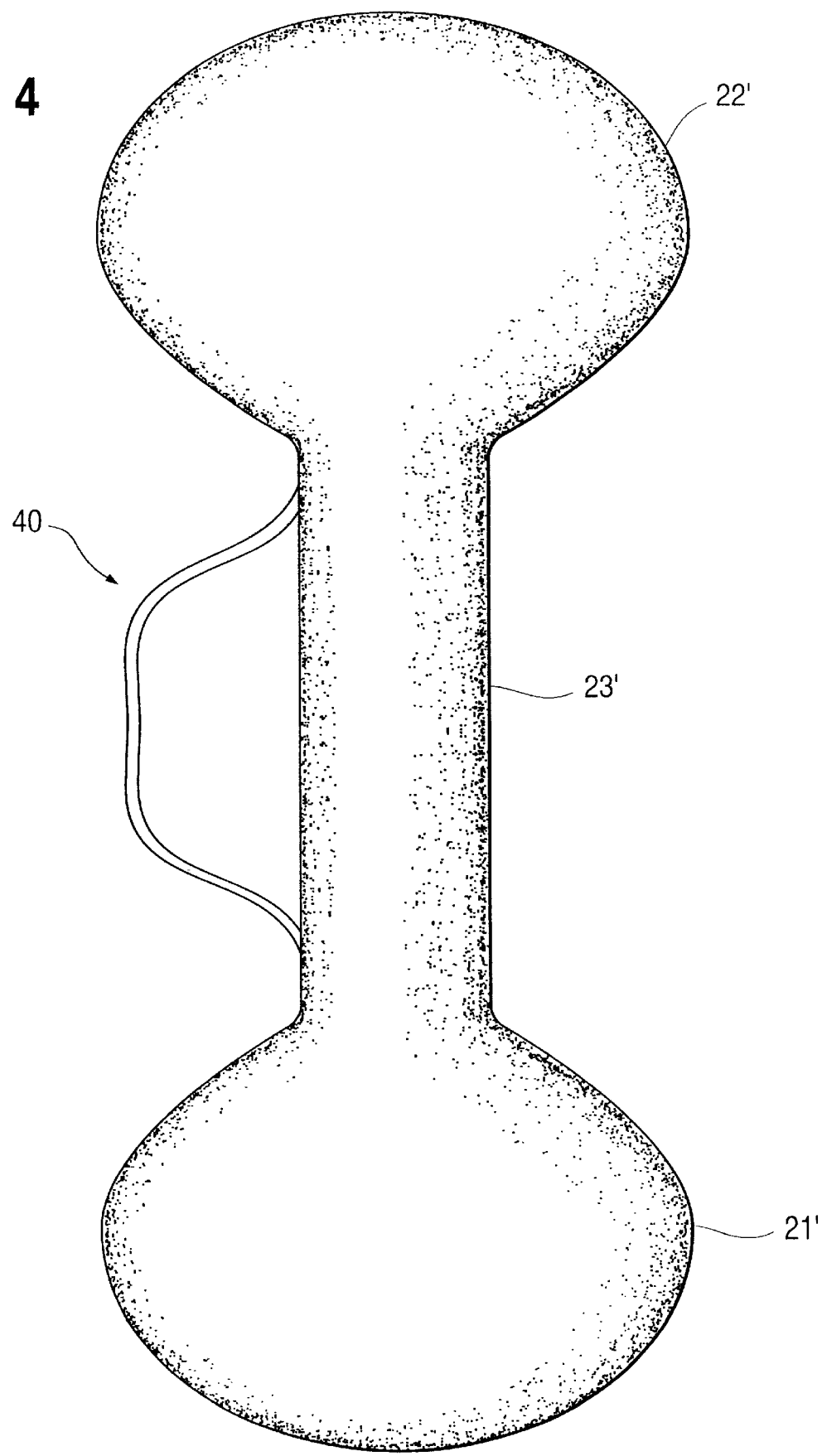
FIG. 4 is a top plan view of another version of the preferred embodiment.
Figure 5:
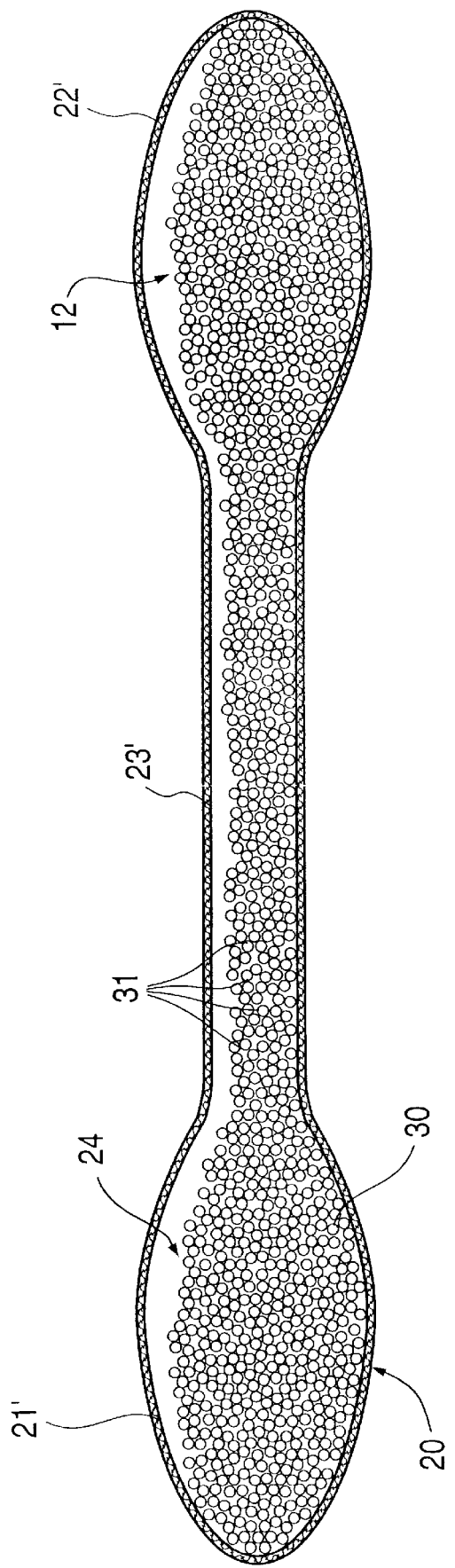
FIG. 5 is a cross sectional view of the second version of the preferred embodiment.
Figure 6:
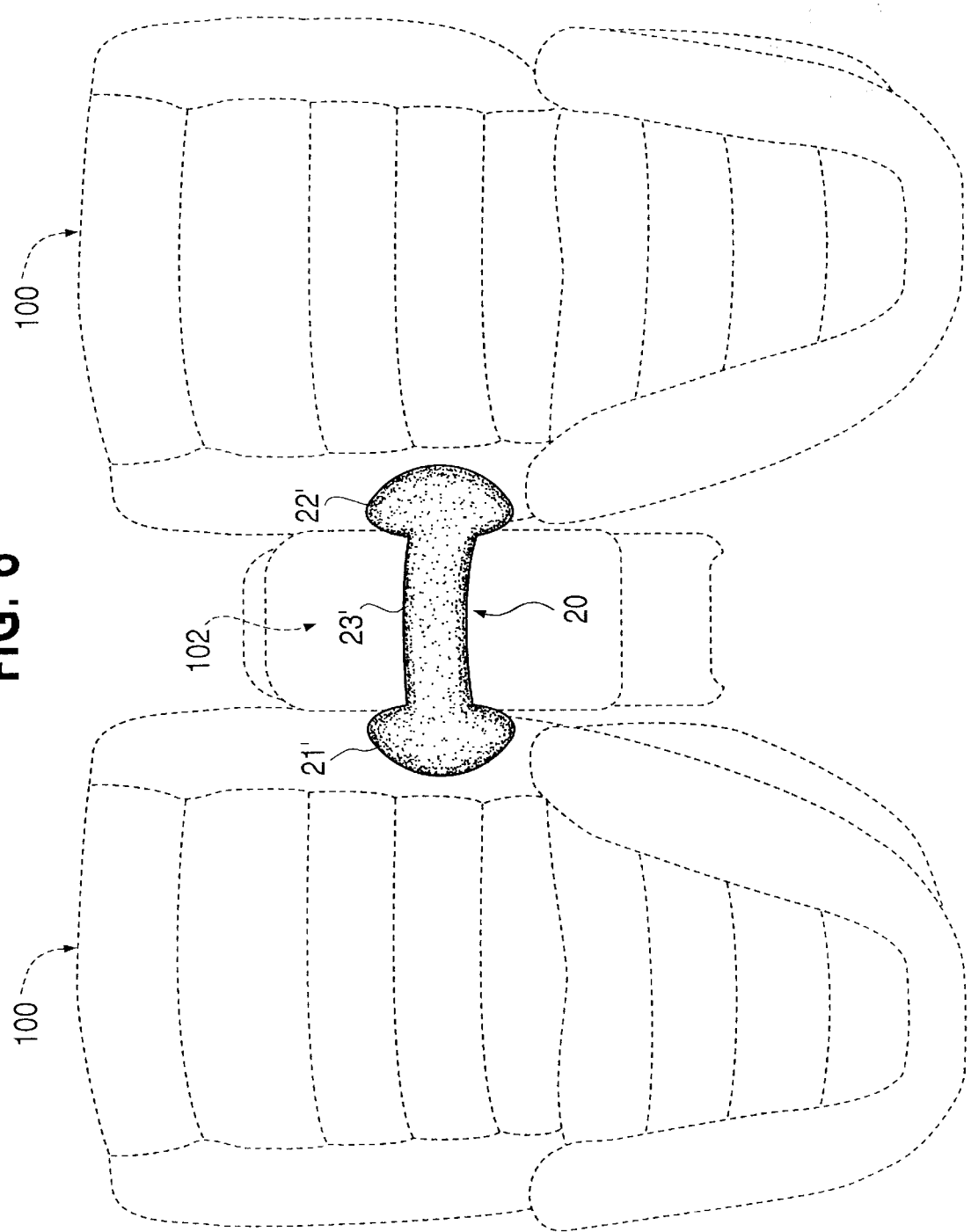
FIG. 6 is a perspective view of the second version of the preferred embodiment in use.

Turning now to FIGS. 4 through 6, it can be seen that in the second version of the preferred embodiment each of the bulbous housing elements 21', 22' are of approximately the same exterior size and interior volume and the neck portion 23' is somewhat elongated relative to the neck portion 23 of the first version.

The reason for this slight disparity in relevant dimensioning is due to the fact that as shown in FIG. 6, the second version of the preferred embodiment is dimensioned to be draped over the center console 102 between vehicle seats 100 so as to provide a padded resting place for the elbows of a driver and passenger in the front seats of a vehicle.

As can also be appreciated by reference to FIG. 4, this invention also contemplates the provision of a handle strap member 40 affixed on its opposite ends to the neck portion 23' of the housing member 20 to facilitate the transport of the body support device 10 to and from a point of use.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. A body support device for use in the interior of a vehicle wherein the device comprises:
    a housing unit including an elongated hollow housing member which includes a pair of enlarged generally bulbous housing elements connected to one another by an elongated relatively narrow generally flexible hollow neck portion wherein the interior of the enlarged bulbous housing elements and the narrow neck portion define a continuous hollow chamber; and,
    a filler unit including a volume of filler material that at least partially fills said hollow chamber; wherein the filler material comprises generally spherical particles which are easily displaceable from one end of the hollow chamber whereby the weight and density of the bulbous housing elements can be varied relative to one another, whereby when the bulbous housing elements are filled to their respective maximum capacity with filler material, the elongated hollow neck portion is devoid of filler material.

2. The device as in claim 1 wherein said volume of filler material only partially fills said hollow chamber.

3. The device as in claim 1 wherein one of the bulbous housing elements is substantially larger in size and has a larger interior volume than the size and interior volume of the other bulbous housing elements.

4. The device as in claim 3 wherein the neck portion of the housing member is adapted to be dimensioned to be draped over the top of a vehicle seat in the interior of a vehicle.

5. The device as in claim 1 wherein both of the bulbous housing elements are of approximately the same size and interior volume.

6. The device as in claim 5 wherein the neck portion of the housing member is adapted to be dimensioned to be draped over a center console disposed between two vehicle seats in the interior of a vehicle.

7. The device as in claim 1 wherein said particles are in the form of beads.

8. The device as in claim 1 wherein said particles are fabricated from plastic.

9. The device as in claim 1 wherein said particles are fabricated from Styrofoam.

10. The device as in claim 1 wherein said particles are fabricated from foam rubber.

11. The device as in claim 1 wherein said particles are resiliently deformable.

\* \* \* \* \*